United States Patent
Duyvesteyn et al.

(10) Patent No.: US 6,312,500 B1
(45) Date of Patent: Nov. 6, 2001

(54) HEAP LEACHING OF NICKEL CONTAINING ORE

(75) Inventors: Willem P. C. Duyvesteyn, Reno; Houyuan Liu; Michael J. Davis, both of Sparks, all of NV (US)

(73) Assignee: BHP Minerals International Inc., Houston, TX (US)

( * ) Notice: Subject to any disclaimer, the term of this patent is extended or adjusted under 35 U.S.C. 154(b) by 0 days.

(21) Appl. No.: 09/539,063

(22) Filed: Mar. 30, 2000

(51) Int. Cl.[7] ................................ C22B 3/08; C22B 23/00
(52) U.S. Cl. .................................... 75/712; 75/743
(58) Field of Search ........................ 75/712, 743

(56) References Cited

U.S. PATENT DOCUMENTS

| | | |
|---|---|---|
| 4,195,986 | 4/1980 | Schulz et al. . |
| 4,541,868 | 9/1985 | Lowenhaupt et al. . |
| 4,548,794 | 10/1985 | Lowenhaupt et al. . |
| 4,701,309 | 10/1987 | Ramachandran et al. . |
| 5,077,021 | 12/1991 | Polizzotti . |
| 5,527,382 * | 6/1996 | Pincheira Alvarez et al. ........ 75/712 |
| 5,571,308 | 11/1996 | Duyvesteyn et al. . |
| 5,642,863 | 7/1997 | Patzelt . |

* cited by examiner

Primary Examiner—Roy King
Assistant Examiner—Tima McGuthry-Banks
(74) Attorney, Agent, or Firm—Brinks Hofer Gilson & Lione; G. Peter Nichols

(57) ABSTRACT

A process is provided for heap leaching ore to recover nickel. The process is particularly effective for ores that have a tangible clay component (i.e., greater than about 10% by weight). The process includes sizing the ore (where necessary), forming pellets by contacting ore with a lixiviant and agglomerating. The pellets are formed into a heap and leached with sulfuric acid to extract the metal values, including nickel. The leachate may be subjected to a nickel recovery operation without the need for intermediate neutralization.

12 Claims, 4 Drawing Sheets

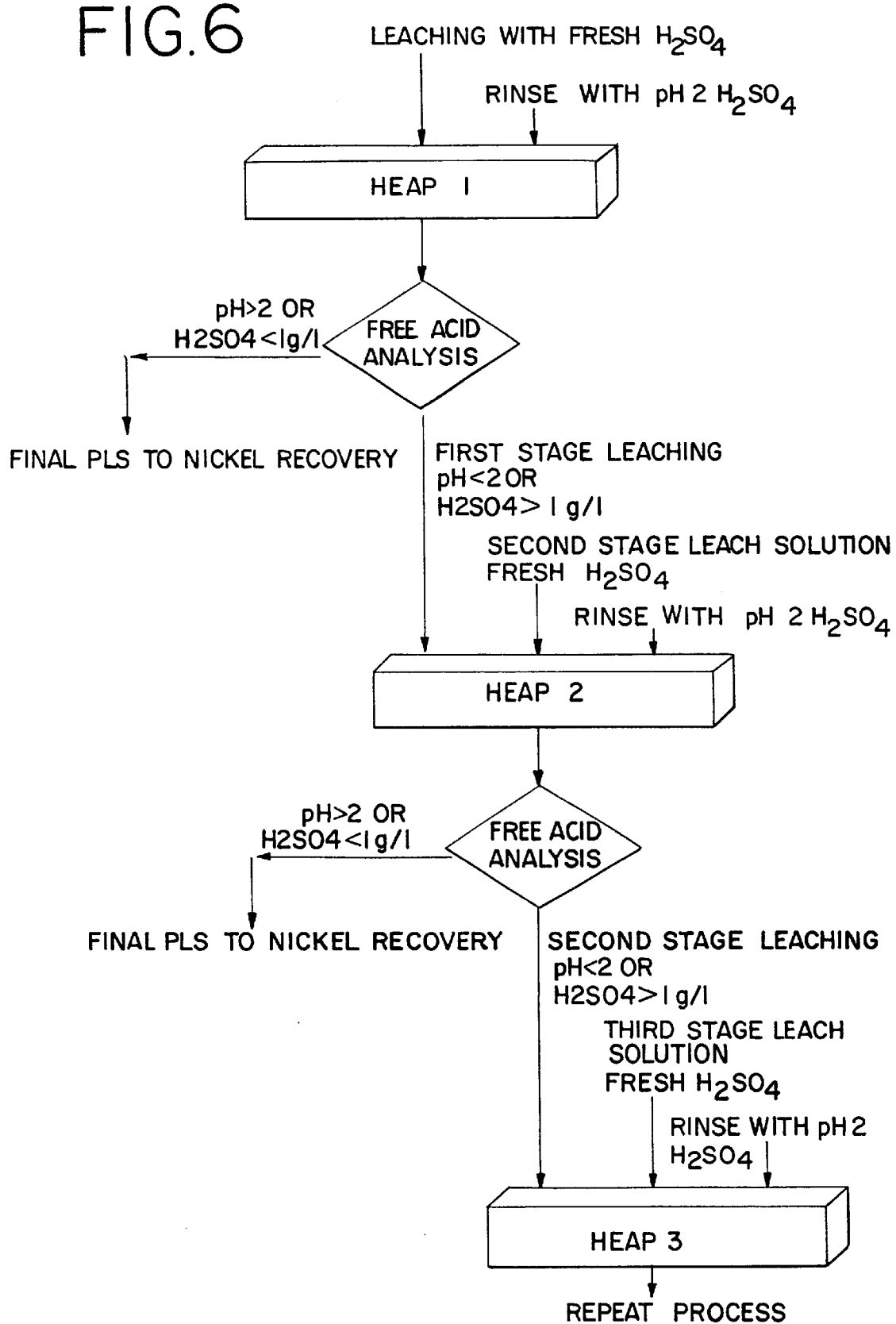

HEAP LEACHING OF NICKEL CONTAINING ORE

The present invention relates to a method of operating a heap leach for leaching nickel-containing ore to recover nickel. In particular, the present invention is directed to a method of heap leaching nickel-containing ore having a tangible clay component (i.e., greater than about 10%, by weight, of clay). More particularly, the present invention is directed to an economical method of heap leaching nickel-containing laterite ores that have a tangible clay content.

Laterite ore deposits have historically been overlooked in favor of higher-grade sulfide deposits, although they are an abundant source of low-grade nickel ore. Now, easily mined sulfide ore bodies are beginning to disappear and, in combination with the growing environmental concerns of processing these ores, lateritic deposits will become an increasingly important source of the world's nickel and cobalt.

To date, the processes for extracting nickel from laterite ores has been confined to expensive and/or energy intensive methods. For example, it is known to smelt the laterite ore, which is quite energy intensive. It is also known to pressure leach the laterite ore with sulfuric acid, which requires expensive autoclaves, flash tanks, etc. and is highly corrosive. Thus, there is a need for an economical effective method for obtaining nickel from laterite ores.

Heap leaching is a conventional method for economically extracting metals from low-grade ores. Generally, it simply involves piling raw ore, taken directly from an ore deposit, into heaps that vary in height. The leaching solution (lixiviant) is introduced upon the top of the heap to percolate down through the heap. The effluent liquor passes into, for example, perforated drainpipes arranged on the surface of the base beneath the heap. The drainpipes direct the effluent liquor into a header for transport to a processing plant where the metal values are separated from the effluent and recovered.

Although heap leaching has been successfully used to recover metal values such as copper, gold, silver, and uranium, the heap leaching process has not been proposed for recovering nickel from particular laterite ores that contain a tangible clay component. Besides being a generic term for specific clay minerals, "clay " also implies particle size. According to John Bichard (Oil Sands, Composition and Behaviour; Alberta Oil Sands Technology and Research Authority, Edmonton 1987, pp. 3–7), "clay" is frequently defined as material less then 325 mesh (<44 micron) in size.

One problem hindering the heap leaching of laterite ores is the substantial clay component present in such ores. The clay minerals have a number of common characteristics. Their structural classification is based on composite layers built from components with tetrahedral and octahedral coordinated cations. Most of them occur as platy particles in fine-grained aggregates, which when mixed with water yield materials that have varying degrees of plasticity. The clay minerals are generally classified into four layered mineral groups and they are kaolinite, smectite (montmorillonite), vermiculite, and illite. The chemical composition of clay minerals is principally hydrous silicate minerals of aluminum or magnesium.

The type of clay mineral formation is dependent on parent rock and the physico-chemical environment of clay formation. For example, clay minerals associated with porphyry copper mineralization are distinctly different from clay minerals associated with the lateritic nickel mineralization. The clay minerals associated with porphyry copper are primarily acidic and intermediate rocks (high silica), which suffered intense hydrothermal alteration to form kaolinite, illite and montmorillonite. In contrast, the clay associated with nickel saprolite and limonite is formed by near surface weathering of relatively unstable parent rocks like basic or ultrabasic (low silica).

It has been reported that when the laterite ore is piled dry, the leach solution percolation was poor to impossible. This poor percolation observation has been explained as being the result of the absorbent nature of the clay constituents that, when wetted with the leach solution, swelled and closed the established porosity. Because of the poor permeability, a low irrigation rate is required so that the leach solution can effectively leach the nickel and thus, the leaching will require an undesirably long time.

The method of the present invention solves that problem by pre-treating the ore with a concentrated acid to physically and/or chemically agglomerate the fine clay particles. It is believed that the concentrated acid breaks down the clay minerals and metal silicates and solubilizes the silica gel so that reprecipitated silica as well as precipitated metal sulfates will act as a binding agent that, upon curing, will produce a rather strong pellet. Advantageously, these pellets, when formed into a heap, allow a high percolation flux rate. Consequently, the leach time is economical.

BACKGROUND

In general, it has been found that most deposits of nickel-cobalt laterites contain three major zones based on morphology, mineralogy, and chemical composition. These three zones from the base to the surface atop weathered parent bedrock materials are the saprolite zone, the transition zone, and the limonite zone with large variations in total thickness of the deposit, as well as individual zone thickness. The saprolite zone consists of three separate subzones: rocky saprolite, saprolite, and ferruginous saprolite. This saprolite zone consists predominantly of "saprolitic serpentine" and a large variety of nickel-magnesium silicate minerals that belong to the septochlorite group of minerals as defined in "An introduction to the Rock Forming Minerals" by Deer, Howie and Zussman; Longman Group Limited, London, UK, 1983. Septochlorites (general chemical formula: $A_6(B_4O_{10})(OH)_8$ wherein A represents Mg, Fe, Ni, and/or Al and wherein B represents Si, Fe, and/or Al) are characterized by serpentine like layers, with each layer having a tetrahedral $(Si Al)_2O_5$ component linked to it by a tri-octahedral brucite-type (MgO) compound. Various arrangements of layer stacking are possible and they give the laterite deposits its layered and clayey structure. The weathering process or serpentinization of the ultrabasic bedrock (a low nickel (~0.2%) and high (~5%) iron containing magnesium olivine mineral) is characterized by a decrease of Mg in the ultrabasic and an increase in Ni and Fe upward. The resulting saprolite zone contains between 0.5 and 4% Ni.

The not-well-defined transition zone is composed essentially of nontronite-type clays (smectite group) and quartz. It also commonly contains Ni in the range from 1.0 to 3.0% with coexisting Co ranging from 0.08% up to 1% Co (associated with asbolane, a hydrated manganese oxide). The limonite zone (with nickel ranging from about 0.5 to 1.8%) consists of an upper hematite-rich section and a lower goethite-rich section and is rich in Fe, Al, and Cr. Sometimes the weathering has not been fully completed and either the hematite or the goethite rich sections are not present. Alternatively, depending upon the climatic condition the limonite zone will still contain residual iron-aluminum silicates, such as chlorite that are nickeliferous.

While heap leaching copper ores is well known as a unit operations, there are several differences between heap leaching of copper containing ores that also contain some clay components and the lateritic ores that have a substantial clay component.

The laterization process occurs mainly in tropical or subtropical environments, where warm, humid, and good drainage environments are prevalent. This process occurs with slow dissolution of olivine and pyroxene along micro-fractures and grain-boundaries of these minerals usually removing soluble metal like magnesium and leaving porous silicate-(serpentine), silica-(chalcedony, tridymite) and iron-skeleton (sieve texture) or box-work or sometimes called mesh texture especially for serpentine.

In tropical wet-dry climates, clay formation is more prevalent due to poor drainage and high pH environment. In addition, it has been reported that in areas where the drainage is poor, a greenish iron-rich silica gel is first formed and recrystallization of the gel occurs over time to form nontronite (Fe-smectite, or greenalite), hectorite (Ni-smectite), and saponite (Mg-smectite). Nontronite mineral profiles are very common in tropical climates with prolonged dry seasons, e.g., Ivory Coast, the Western Australia nickel deposits, Cuba, Brazilian Shield, etc. Amorphous iron-nickel rich silica gel is very common in various West Australian deposits such as the Bulong and the Murrin Murrin nickel deposits. These silica gels are readily, but slowly soluble in acidic solution.

It has been found that the permeability of lateritic ore is largely controlled by the type of mineral occurrence, mineral morphology and particle size. Although the mineralogy of lateritic ore is rather complex and widely variable from deposit to deposit, there is some commonality or similarity of mineral morphology in the worldwide lateritic nickel deposits, e.g. oolites and pissolite of iron oxides in ferricrete horizon, mesh or sieve texture of serpentine, skeleton or sieve texture of chalcedonic quartz, and iron oxides. These morphological structures enhance permeability of solution and preserve physical stability of individual minerals. Although experimental data on behavior of nontronite on permeability is not available, it is expected that nontronite may have properties similar to other smectitic clays.

Nontronite in lateritic ore, however, usually occurs with silica box-works, precursor silica gel and transitional amorphous compounds between gel and nontronite. This mineral morphology of precipitated silica gels is not generally found in porphyry copper ore deposits.

Samples of such a nickel containing ore with a substantial clay component is provided in the following table where rheological properties of a number of different laterite ores are presented.

|  | Ore Type | Solid Content (wt %) | Yield Strength (dynes/cm$^2$) | Bingham Viscosity (centipoise) |
|---|---|---|---|---|
| West Australian Ore | Limonite/Saprolite | 25 | 722 | 80 |
| New Caledonian Ore | Limonite | 28 | 40 | 11 |
| New Caledonian Ore | Saprolite | 28 | 1700 | 57 |
| New Caledonian Ore | Blend | 28 | 400 | 18 |
| Indonesian Ore | Limonite | 30–40 | <150 | <15 |

The high yield stress and viscosity of the ore slurry can result in inadequate agitation in high pressure leaching or atmospheric pressure leaching operations.

In addition, these ores may have the following particle size distribution.

| CUMULATIVE PARTICLE SIZE DISTRIBUTION (WT-% PASSING) | | |
|---|---|---|
| NICKEL LIMONITE ORE | MICRON | NICKEL SAPROLITE ORE |
| 80 | 37 | 30 |
| 100 | 297 | 45 |
|  | 841 | 50 |
|  | 1680 | 58 |
|  | 6350 | 84 |

The above table clearly demonstrates that both limonite and saprolite nickel ores contain significant quantities of very fine material as well as a significant clay content.

U.S. Pat. No. 5,571,308 describes a process of heap leaching high magnesium containing lateritic ores such as saprolite. The patent points out that the "clay-type" saprolite exhibited poor permeability during filtration. As a solution to this problem, the patent noted that pelletization of the ore is an important expedient to assure uniform distribution of the liquid-reagent throughout the heap and to provide pellets of sufficient shape integrity to resist gravimetric flow and yet assure the desired permeability for irrigation or percolation of the reagent solution throughout the heap. The reported irrigation flow flux was 10 l/hr/m$^2$, which is at the high end of conventional copper and gold heap leaching practices. Nickel laterites have a rather high acid consumption (hundreds of kgs. of acid per ton of ore versus about ten kgs. per ton of copper ore) because of the soluble magnesium content, low-flux heap leaching could require a long time. For example, heap leaching of nickel laterite ore could require as much as two to five years at this percolation flux to obtain reasonable nickel extraction (>80%). Therefore, the acceleration of nickel leaching kinetics is an important issue for the techno-economic success of heap leaching nickel laterite ore.

Heap leaching of laterites by sulfuric acid at ambient temperatures is reported in Heap Leaching of Poor Laterites by Sulphuric Acid at Ambient Temperatures, S. Agatzini, et al, Hydrometallurgy 1994, Institution of Mining and Metallurgy, London, 1994 page 193–208. There, the laterite ore had the following particle size distribution:

| Particle size (microns) | Wt. % |
|---|---|
| +850 | 80.2 |
| −850 to +360 | 4.5 |
| −360 to +180 | 4.8 |
| −180 | 10.5 |

Thus, it can be seen that this ore was coarse and hence very competent as it is not fine-grained and therefore, does not contain much clay at all. In addition, the reported ore consisted of nickel chlorite, hematite, quartz, chromite, and small amounts of talc, illite and diaspore. The ore was characterized by a pissolitic texture, with pissolites composed of microcrystalline hematite aggregates set within a peliomorhic red matrix. The matrix consisted primarily of quartz and chromite grains surrounded by chlorite and fine dispersed hematite and secondary illite and diaspore. The competent rock reportedly did not contain any of swelling smectite-type clays, like nontronite, saponite, and hectorite.

Moreover, the reported ore contained a significant presence of limestone (5.68% CaO), which generally is never present in an amount larger than a few 100 ppm in a typical nickel laterite. Furthermore, the reported ore did not contain goethite, which is always readily present in typical nickel laterite ores. Thus, this paper does not address the use of heap leaching of a nickel containing ore that contains a substantial clay component.

The present invention teaches how to operate a heap leach to maximize the recovery of nickel at maximum efficiency independent of the recovery procedure for extracting the nickel from the effluent. In particular, the present invention solves the problem of extracting nickel (and cobalt) from those nickel containing laterite ores having a tangible clay component.

SUMMARY OF THE INVENTION

The present invention provides a process for heap leaching laterite ores that contain a substantial clay component. In general, the process includes the steps of ore pretreatment, heap construction, and heap operation. The ore pretreatment includes the steps of ore selection, size reduction (where necessary), and pelletization of ore. The operation of the heap includes the steps of applying an acid at a high percolation flux to provide accelerated heap leaching kinetics as consequence of pelletization, iron control inside heap, and decrease of acid consumption. Alternatively, the method of the present invention contemplates the operation of a suitable number of heaps in a counter-current fashion.

In a preferred embodiment, the process includes reducing a nickel-containing ore that has a substantial clay component to an average particle size of less than about one inch. The reduced particles are formed into pellets by mixing them with a concentrated acid (preferably concentrated sulfuric acid) and agglomerating them in, for example, a rotary disk, drum, or other suitable apparatus. The amount of acid used to agglomerate the pellets is generally that amount required to immediately neutralize the ore. In other words, the amount of acid is generally the amount to neutralize the readily available MgO. In general, the amount of acid ranges from about 20 to about 100 kg. of (100%) acid per ton of ore.

The agglomerated pellets may then be cured for a suitable period of time ranging from as little as one hour to several days.

The pellets are then formed into a heap having a base and a top. A leach solution is applied to the top of the heap and allowed to percolate downward through the heap. The leach liquor (solution) is collected at the bottom and may be recycled, collected for nickel (and/or cobalt) recovery, or a combination of both. The leach solution preferably contains sulfuric acid, but other acids such as hydrochloric and nitric acid are also feasible.

The heap may then be rinsed with water (either fresh or salt water), concentrated or dilute acid or a combination of them with the effluent being collected for recovery of metal values.

As used in the following description and appended claims, the phrase "substantial clay component" and "tangible clay component" refers to those ores that contain at least about 10% by weight clay, particularly, containing at least about 20% clay and more particularly, more than about 25% clay. In addition, the term "clay" as used in the specification and claims is defined as any solids with a particle size smaller than about 44 micron.

BRIEF DESCRIPTION OF THE DRAWINGS

FIG. 6 shows a flow sheet of one embodiment of the present invention.

DETAILED DESCRIPTION OF THE INVENTION

Figure 1:
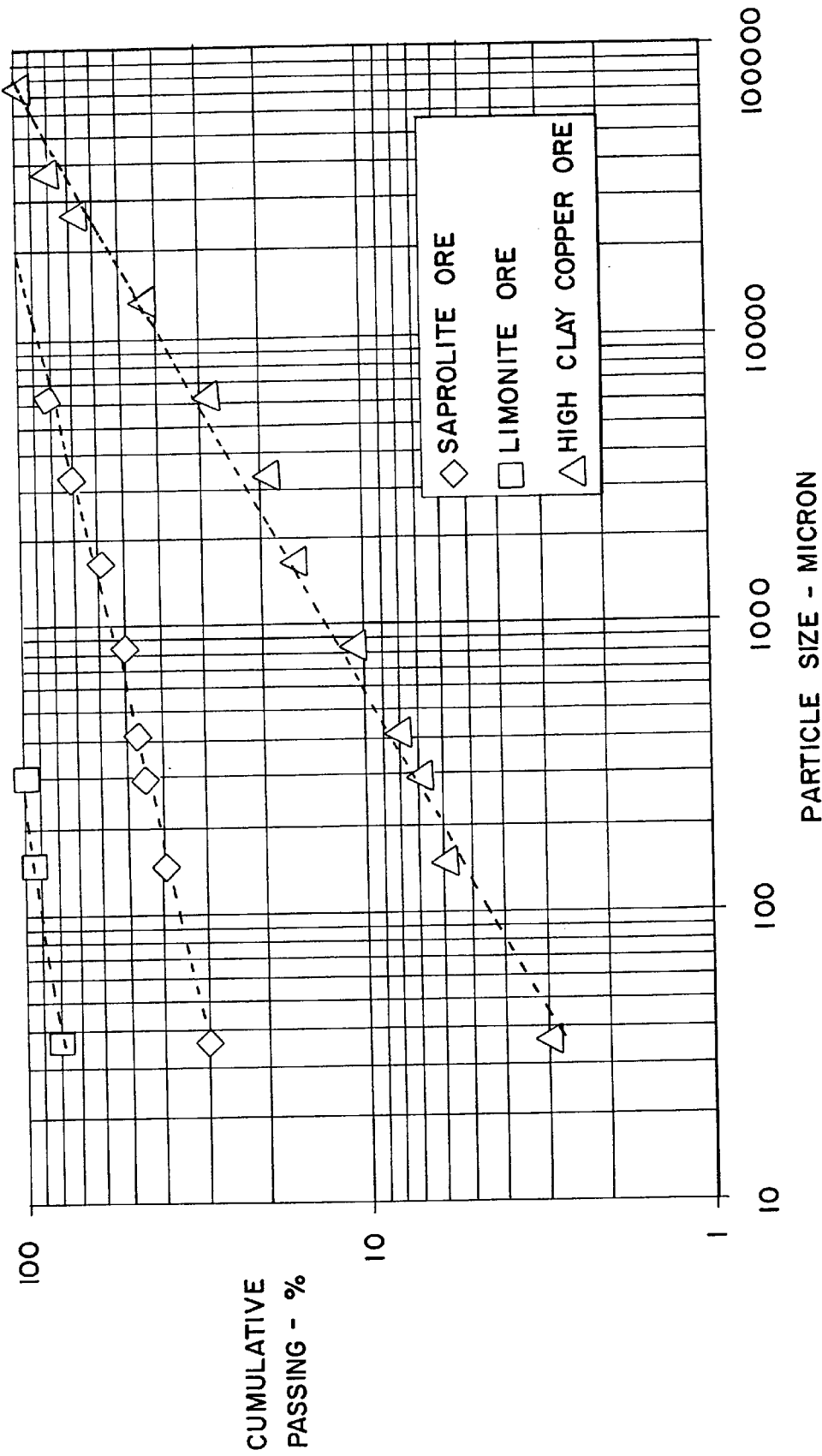
FIG. 1 is a graph showing the particle size distribution of ores described in Example 1, below.

In accordance with the present invention, a method is provided for heap leaching laterite ores that contain a substantial clay component. The process includes reducing, when necessary, a nickel-containing ore that has a substantial clay component to an average particle size of less than about one inch. It will be understood by one of skill in the art, that where the ore already has a fine particle size, size reduction will not be required or necessary.

The reduced particles are formed into pellets by mixing them with a concentrated acid (preferably sulfuric acid) and agglomerating them in, for example, a rotary disk, drum, or other suitable apparatus. The agglomerated pellets a generally cured for an amount of time that may vary from an hour to several days, depending on the completion of the "chemical bonding process" that takes place. The chemical bonding process consists of resolubilization of precipitated silica gel and the dissolution of iron and magnesium from the ore with the strong acid used for pelletization. During the curing process, excess water evaporates and some of the water is taken as crystal water and causes a reprecipitation of a magnesium-iron-silica gel "glue" that acts as a chemical bonding agent between the solid particles making solid pellets that have a definite physical strength. The curing time will be a function of the quantity of excess, or free, water that needs to be removed from the "glue" phase.

Without being bound by any particular theory, it is believed that the above agglomeration process provides an open structure that enhances leaching kinetics. As noted above, in copper leaching the acid consumption is about 10 to about 50 kgs. acid per ton of ore. At least a portion of the acid is consumed by the calcium, aluminum and/or magnesium component of the ore. As a result, about 0.5 kg. of ore is dissolved for every kg. of acid. Consequently, for an acid consumption of about 25 kg. per ton of or ore, about 12 kgs. of ore or about 1.2% of the ore is dissolved.

In contrast, nickel-containing ore consumes about 600 kg of acid per ton of ore. About one-half of the acid is consumed for the dissolution of MgO and the balance is consumed for the dissolution of iron, aluminum, and/or nickel. Therefore, 600 kg. of acid will consume about 300 kg of solids in the ore, or about 30% of the ore. This is about 25 times the weight loss that is experienced with copper leaching. As a result of this weight loss, it is believed that the resulting agglomerated pellets have a more open structure, particularly as compared to copper.

The agglomerated pellets are then formed into a heap having a base and a top. A leach solution is applied to the top of the heap and allowed to percolate downward through the heap. The leach liquor (solution) is collected at the bottom of the heap and may be recycled, collected for nickel (and/or cobalt) recovery, or a combination of both. The leach solution is preferably sulfuric acid. The leach solution may be a recycled solution from which pay metal values have been recovered.

The method of the present invention is particularly suited for the nickel containing deposits that contain a substantial clay component. This refers to those deposits containing nickel wherein the clay comprises at least about 10% clay, generally more than about 20%, and typically more than about 25% clay. As noted above, clay refers to those particles having a particle size less than about 44 microns.

These clay components are often also present in the oxidized cap of nickel sulfide ore bodies and consequently these oxide or mixed oxide/sulfide ores can advantageously be processed with this invention. Such oxide cap ore generally contains more than 10% clay.

In the practice of this invention, the ore sample is initially crushed, when necessary, to a particle size range of less than one inch (2.54 cm) and, preferably between about 6 mesh (3350 micron or ⅛inch) and about ¾inch, pre-mixed with sulfuric acid and agglomerated to form particles (pellets) and then cured.

The ore is pelletized by mixing the ore with sulfuric acid having a concentration of at least 100 gpl acid, preferably 50% and more preferably about 93–98%. The pelletizing may be carried out in a rotary disk, drum, or other suitable apparatus known to those of skill in the art. The sulfuric acid may be mixed with a source of water, including saline, fresh water, or recycle solution. The quantity of sulfuric acid used is generally that necessary to attack the acid consuming mineral materials in the ore (generally the readily available MgO from magnesium silicates that are present in the ore). Typically, the quantity ranges from about 20 to about 100 kg of equivalent 100% sulfuric acid per ton of ore (dry base).

The resulting agglomerated particles (pellets) have an average particle size between about 6 mesh (3350 micron) and about 1 inch (2.54 cm). The agglomerated pellets are optionally cured. The curing time can range from about 1 hour to about 2–3 days. Preferably, the curing time ranges from about 4 to about 10 hours.

As referred to in the specification and appended claims, the term curing means that the pellets are stored in open air, undisturbed for a time period long enough so that the sulfuric acid will have enough chemical reaction time to partially dissolve some of the ore and to remove some of the contained water (by air evaporation) such that basic sulfates and/or silicates, or silica gel is precipitated and formed into a binding agent to keep the remaining ore particles together in pellet form.

The pellets are piled to form a heap having a height in the range between about 2 to about 30 feet tall. At this height, the heap can be left, in situ, for reclamation after the leaching operation is completed. Alternatively, the pellets can be stacked into vats, which should be considered to consist of a heap with a limited, fixed wall size. In addition, the heap is generally made with pellets so that the heap has an apparent density of 0.9 to 1.1 g/cm$^3$ and a porosity (voidage) of 0.3 to 0.6. This allows the use of a high percolation flux (from 10 to 100 l/hr/m$^2$), thereby significantly increasing leaching kinetics.

The heap is formed in the following manner. The raw ore is, if necessary, crushed to the desired particle size, identified above. A sample of the particles is taken to determine the mass of sulfuric acid necessary to agglomerate the particles. The particles are then agglomerated and cured. The agglomerated and cured particles are then piled into a heap.

Preferably, the pelletized agglomerated ore is formed into two, or a series of, heaps. A schedule for operating the two heaps following the principles of the present invention is depicted in FIG. 6. As shown in FIG. 6, there is a lead heap and a lag heap. The agglomerated pelletized ore, however, may be formed into any economically suitable number of heaps or vats.

Optimum recovery of nickel is realized when about 300 to about 700 kg sulfuric acid per ton of dry ore is consumed. The acid is typically added to the heap recycle solution with an acidity of about 2 g/l to about 500 g/l, preferably at least about 10 g/l, and desirably from about 20 g/l to about 100 g/l to minimize the overall acid consumption. A low acid gradient throughout the heap increases the selectivity of nickel leaching compared with iron. Iron, when present as ferric iron, precipitates as hydroxides or basic sulfates within the heap if the pH of leachate is over 3. Therefore, the present invention provides an effective method to control iron with heap leaching. The large porosity or voidage (0.3 to 0.6) of the heap, which is the result of the present pelletization technique, minimizes or prevents blockages caused by any iron precipitation.

Because of it's high MgO content, all saprolite ores are very basic and are considered to have acid neutralization potential. Yoshio Ogura in (Y. Ogura, et al. "Geochemistry and Mineralogy of Nickel Oxide Ores in the Southwestern Pacific Area", Proceedings of the International Seminar on Laterite Processing, Trivandrum, India, 1979, Oxford and IBH Publishing Co. New Dehli, 1981) presented data on measurements of pH values of aqueous solutions in contact with different ore zones of laterite deposits. Since nickel laterite ore is formed by dissolution and precipitation of chemical components from the weathering of parents rocks, there needs to be a change in the pH value in a laterite ore profile. Ogura's data are presented in the following table.

| pH vatues in laterite ore zones | | |
| --- | --- | --- |
| Ore Zone | Depth in meters | pH |
| Limonite | 0–8 | 5.6–6.2 |
| Saprolite | 8–20 | 6.9–8.3 |
| Bed Rock | +20 | 8.6–10.0 |

If a saprolite ore is mixed with a nickel containing acidic solution, (pH from 0.5 to about 2), or if such a solution is passed over an ore pile of saprolite ore or bed rock material the residual acid will be neutralized by the ore, raising the pH to between 3 and 4. If there is any ferric iron present in the acid nickel solution, it will precipitate as the pH is raised, since ferric hydroxide starts to precipitate at a pH of about 2.5. Hence passing a ferric iron containing solution over a heap of saprolite ore or bed rock will result in precipitation, but since the porosity of a pelletized heap is very large (50% or more), there is more than enough room and surface area for iron to precipitate and the hydroxide to be retained inside the heap.

Having laterite ore that is being weathered implies that some of the ore has been weathered and converted to the various nickeliferous magnesium silicates and that some of the ore consists of unweathered ultrabasic rock. This part of the ore, generally the core of boulders and rock fragments, is relatively high in high magnesium silicate minerals (such as olivine) that do not dissolve readily in heap leach solution. Since the acidity of the heap leaching solution can be well controlled, this parameter will provide an opportunity to minimize the consumption of acid by parasitic high magnesium, low nickel silicate minerals.

The acid solution is generally applied by spraying it onto a layer of inert bed rock, which acts as liquid distributor on the heap, although any method to adequately and uniformly disperse the acid onto the heap can be used. The acid solution is applied at a flux rate of at least 10 l/hr/m$^2$, preferably at least about 20 l/hr/m$^2$. Substantially greater flux rates (such as 100 l/hr/m$^2$ and higher) may be used with the upper limit being dictated by what geotechnical specialists have defined as the hydraulic conductivity or a bed of solids.

Laterite orebody bedrock is generally an ultramafic rock consisting of hydrated magnesium silicates that has limited acid neutralization capabilities. Its neutralization capacity can be increased significantly if the ore is subjected to a dehydroxilation process whereby ore is heated to a temperature between 300 and 800° C. to remove the chemically bound water and to convert the hydrated magnesium silicate into a compound with a magnesium oxide/silicate content that can consume acid.

To assure maximum recovery of nickel at maximum efficiency each heap is leached in the following manner. The first heap is leached with fresh lixiviant ($H_2SO_4$) having a concentration of at least 10 gpl. The heap is rinsed with $H_2SO_4$ having a pH of 2. The leach liquor is collected and analyzed for the presence of free acid. If the pH is greater than 2 or the free sulfuric acid content is less than about 1 g/l then the liquor can be directed to a nickel recovery operation. At these levels no further neutralization is required and the nickel can be recovered by, for example, an ion exchange operation. In practice, however, the majority of the leach liquor is directed to heap 2, preferably from about 60% to about 90% of the volume of the leach liquor is directed to heap 2 with the balance being directed to a nickel recovery operation.

In addition to applying the leach liquor from heap 1, fresh sulfuric acid (having a concentration of at least 10 gpl) is applied to heap 2. The heap is rinsed with $H_2SO_4$ having a pH of 2. The leach liquor from heap 2 is analyzed for the presence of free acid. If the pH is greater than 2 or the free sulfuric acid content is less than about 1 g/l then the liquor can be directed to a nickel recovery operation. At these levels no further neutralization is required and the nickel can be recovered by, for example, an ion exchange operation. In practice, the majority of the leach liquor is directed to nickel recovery, preferably from about 60% to about 90% of the volume of the leach liquor is directed to nickel recovery with the balance being directed to a third heap.

As shown in FIG. 6, the process may continue depending on the number of heaps. It has previously been found that, with respect to nickel laterites, the total consumption of acid per ton of ore to obtain adequate nickel and cobalt extraction is critical to the process economics. Surprisingly, it has now been discovered that the amount of acid needed to obtain adequate nickel and cobalt extraction is significantly higher than that required to convert the clay ore into a substance that can be put on a pile, cured, and heap leached. Generally, the limonite zone of a laterite ore body requires between 200 and 400 kg of sulfuric acid per ton of ore, whereas for the saprolite zone the requirements are higher at between 400 and 800 kgs. sulfuric acid per ton of ore. In contrast, in the practice of the present invention, acid in the range of about 20 to about 100 kgs. of sulfuric acid per ton of ore is all that is required to produce a pellet with the desired physical characteristics to withstand handling and pile loads that are incurred from heaping ore up to a height of up to 30 feet.

It is believed that by chemically introducing an initial quantity of lixiviant (preferably, concentrated sulfuric acid) throughout the particle during pelletization and curing stage, the chemical reaction kinetics in the pellet are changed. Surprisingly, it has been found that leaching kinetics of the individual pellets and the whole heap is accelerated, apparently because there is fewer mass transfer limitations.

The following examples illustrate, but do not limit, the present invention. Unless otherwise indicated, all parts and percentages are by weight.

EXAMPLE 1

The following hydraulic conductivity tests demonstrate how pelletization significantly changes the permeability of the heap at a given heap height. The test was performed by sealing the bottom of a tube filled with ore to a base level and allowing water to flow under a constant head into the bottom of the specimen and out of the top. A coarse, approximately 9.5 mm, drain gravel was placed at the top and bottom of the specimen to uniformly distribute the water. A filter material was placed between the specimen and the drain gravel to prevent intrusion of the gravel into the specimen. Tap water was used as the permeating fluid. Measurements were taken such that the volume of water flowing through the specimen with time could be calculated. Hydraulic conductivity was calculated using Darcy's Law. The testing was performed under a no-load condition and under loads simulating given heap height, e.g. 4, 8, and 12 meters.

A load was applied to the specimens by means of a calibrated hydraulic ram placed between two loading plates compressing spring to maintain the load. Settlement of the test specimens was monitored with time to verify when the settlement was completed and the hydraulic conductivity test could begin. Loads equivalent to given heap height were calculated using an assumed moist unit weight of 1.5 grams per cubic centimeter for the ore.

Figure 2:
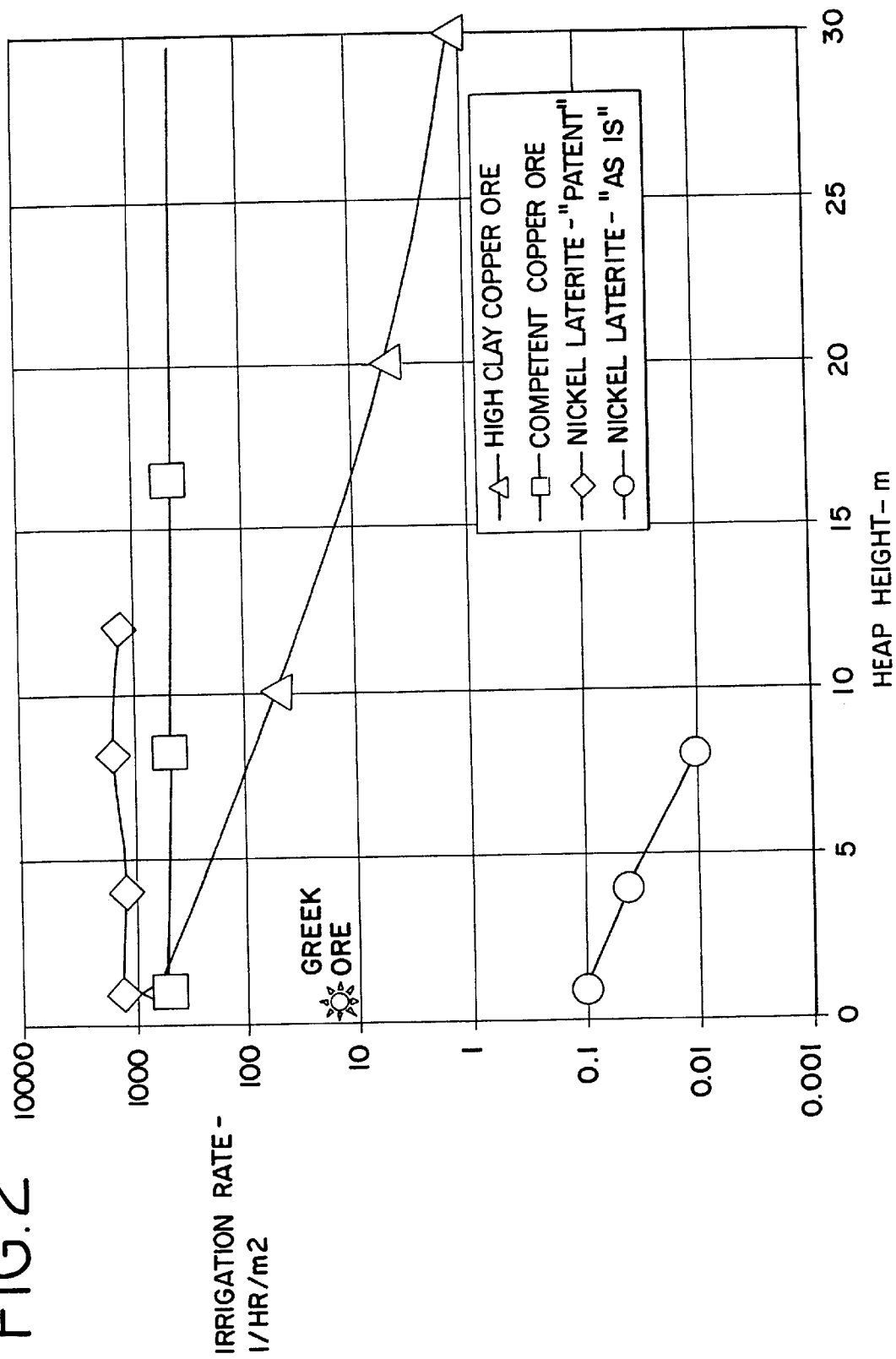
FIG. 2 is a graph showing the results of permeability tests of several ores with varying heap height with and without pelletization.

The permeability results of a nickel laterite ore without pelletization are shown in FIG. 2 (Nickel Laterite—"As Is"). It is seen that this ore has very little permeability and, in fact, is so little as to be not suitable for heap leaching because the leaching time will be unacceptably long under such low percolation flux.

The hydraulic test was carried out with a high clay copper ore having the composition shown Table 1.

|  | Weight % Passing | |
| --- | --- | --- |
| Particle Size (micron) | High clay copper Ore | Competent Copper Ore |
| 149 | 5 | 3 |
| 297 | 7 | 6 |
| 595 | 10 | 10 |
| 1119 | 14 | 16 |
| 2380 | 19 | 28 |
| 4760 | 27 | 46 |
| 9510 | 37 | 75 |
| 16000 | 48 | 100 |
| 19000 | 52 | |
| 24500 | 58 | |
| 38100 | 72 | |
| 76100 | 100 | |

FIG. 1 graphically shows the particle size distribution of the saprolite, limonite, and high clay ores. It was seen that the permeability of the high clay copper ore decreased as the heap height increased. The results are shown in FIG. 2.

A component copper ore having the composition shown in Table 1 has different permeability behavior. As shown in FIG. 2, it was seen that as the simulated heap height increased the permeability did not decrease. It is believed that this effect is because this ore had few fines, did not contain any clay, and was very coarse.

A nickel laterite ore pelletized according to the present invention had quite different permeability behavior. As shown in FIG. 2 (Nickel Laterite—"PATENT"), the permeability was increased by a factor of at least 10,000, as compared to the laterite ore that has not been pelletized. In addition, the permeability remained essential constant, depending on the given heap height. The high permeability can tolerate high percolation flow so that the kinetics of heap leaching is significantly accelerated.

As a comparison, the heap leaching properties reported in Agatzini, referred to above, are also shown in FIG. 2 (noted as "Greek Ore"). It is believed that this ore exhibited flow restrictions due to the formation of gypsum as the sulfuric acid combined with the significant calcium present. Furthermore, the ore was not pelletized using the present invention.

As shown in FIG. 2, a typical clayey laterite nickel ore without pretreatment permeability will allow an irrigation flux rate of around 0.01 $l/hr/m^2$ (note Nickel Laterite—"As Is"). Such a percolation rate has no practical significance, since a one-meter tall heap would require an unrealistic leaching time. For example, to process one ton of nickel ore in a one square meter heap containing 2% Ni would require about 5,000 liter of leaching solution to extract all the nickel. With a percolation flux rate of 0.01 $l/hr/m^2$, this would take 5,000/0.01 or 500,000 hours or about 57 years of operation. Alternatively, if the process according to the present invention would be used, a percolation flux rate, as shown in FIG. 2, of 100 $l/hr/m^2$ might be used and the time required to fully extract the nickel could decrease to 5,000/100 or 50 hours.

EXAMPLE 2

The following test was conducted. Nickel containing ore having a substantial clay component was reduced with a jaw crusher to provide a size less than one inch (2.54 cm). The reduced ore was agglomerated (pelletized) by mixing sulfuric acid having a concentration of 93–98% with the ore in a rotary mixer to form stable pellets. The agglomeration concentration was 25 kg sulfuric acid per ton of dry ore. A portion of the pellets was formed into a heap having a height of 13 feet. Thereafter, sulfuric acid having a concentration of about 50 g/l was applied to the top of the heap at a flux rate of 10 $l/hr/m^2$. Samples were taken to determine the amount of nickel extracted.

Figure 3:
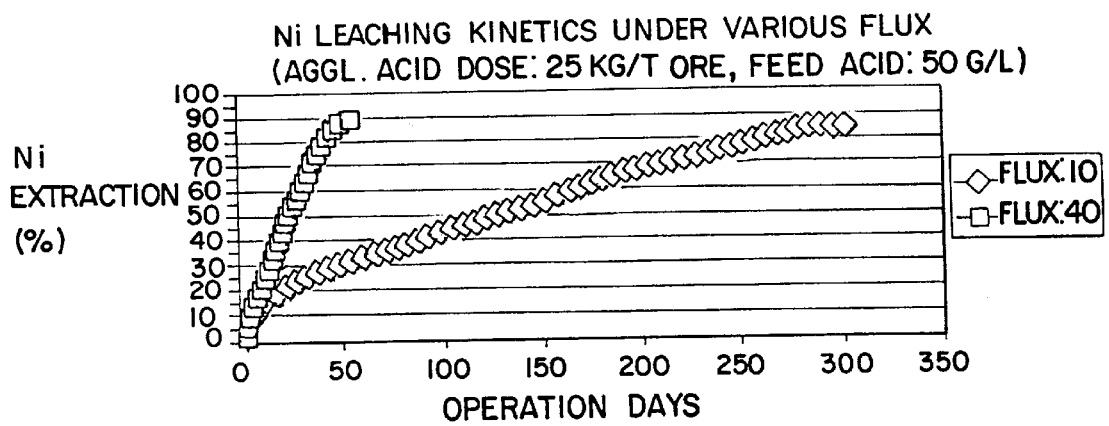
FIG. 3 shows the effect of increasing the application rate of the leach solution on nickel extraction rate using 50 g/l $H_2SO_4$ leach solution where the nickel containing ore has been pretreated, i.e. pelletized according to the present invention.

Another portion of the pellets was formed into a heap having a height of 11 ft. Thereafter, sulfuric acid having a concentration of about 50 g/l was applied to the top of the heap at a flux rate of 40 $l/hr/m^2$. Again, samples were taken to determine the amount of nickel extracted. It was observed that the leaching time decreased by about a factor of seven with the increase in acid application rate by a factor of four. The results are illustrated in FIG. 3.

EXAMPLE 3

Figure 4:
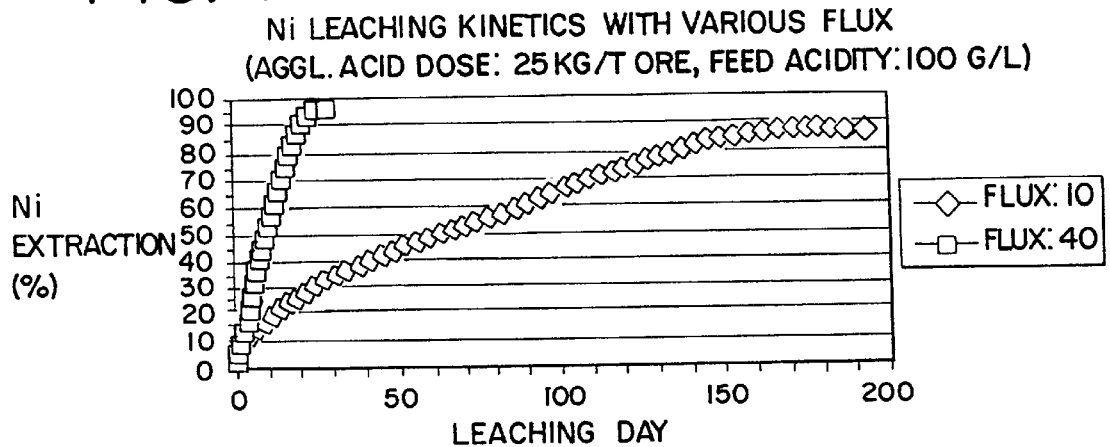
FIG. 4 shows the effect of increasing the application rate of the leach solution on nickel extraction rate using 100 g/l $H_2SO_4$ leach solution where the nickel containing ore has been pretreated i.e. pelletized according to the present invention.

The test of Example 2 was repeated except an acid concentration of 100 g/l was used instead of 50 g/l. The rate of nickel extraction increased as compared to Example 2. In addition, the leaching time decreased by about a factor of seven with the increase in acid application rate. The results are illustrated in FIG. 4.

EXAMPLE 4

Figure 5:
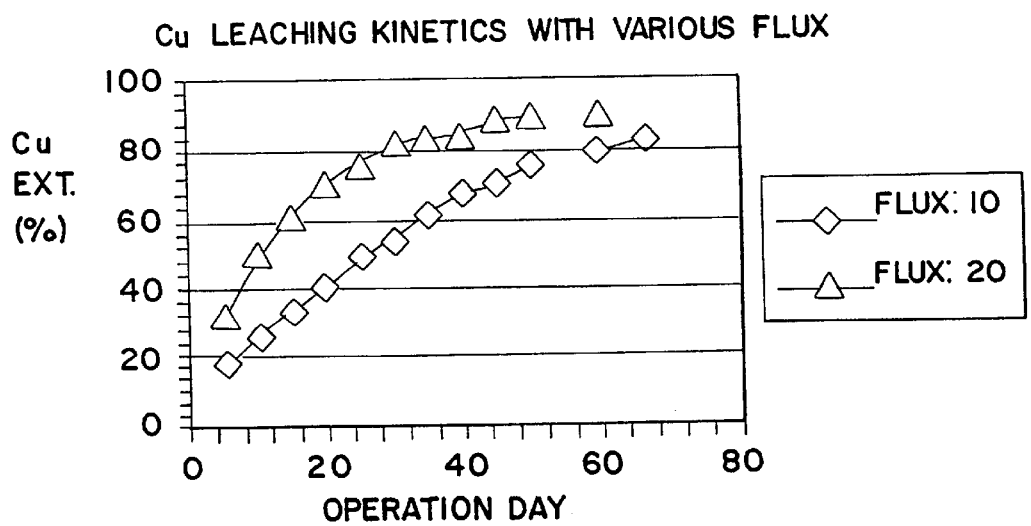
FIG. 5 shows the effect of increasing the application rate of the leach solution on copper extraction rate using up to 14 g/l $H_2SO_4$ leach solution without pelletization.

A comparison test was conducted using a copper containing ore instead of a nickel containing ore. The copper containing ore was formed into two heaps with one having a height of 10 feet and the other a height of 12 feet. Sulfuric acid having a concentration of up to 14 g/l was applied to the top of each heap at an application flux rate of 10 $l/hr/m^2$ and at a flux rate of 40 $l/hr/m^2$, respectively. The copper extraction rate is shown in FIG. 5. It was seen that the increase in the rate of acid application only reduced the leaching time by a factor of at most two. It is believed that the reaction kinetics for copper leaching is primarily controlled by the rate of chemical reaction. In comparison, it is believed that the reaction kinetics for nickel leaching are primarily controlled by diffusion and hence by solution flow or percolation rate.

The above examples and associated figures show that the pelletization, as a pretreatment of ore, increases the permeability of heap as well as the leaching kinetics of heap. In nickel laterite heap leaching, the pelletization allows the use of a higher flux over that of conventional heap technology. Consequently, an increase in the leach kinetics was observed.

EXAMPLE 5

Several tests were conducted to demonstrate the desirability of operating the heap leaching in a counter current fashion as shown in FIG. 6. The counter-current leaching consisted of two columns No. 1 and No. 2. Column No. 1 was initially fed with a solution containing sulfuric acid only at an acidity of 100 g/l. Since the first 21% of Column No. 1 discharge solution (leachate) had the required pH (3 and higher) for metal recovery, it was sent to final solution storage, but the remaining 79% of the leachate was still too acidic for metal recovery and hence was fed to Column No. 2 (called lead leaching). The leachate from Column No. 2 lead leaching was also sent to final solution storage, as excess acid was consumed. Upon completion of the lead leaching, Column No. 2 was fed with a solution containing sulfuric acid only at an acidity of 100 g/l (called lag leaching). The following table summarizes the results of this group of tests. The table clearly demonstrations the benefits of a countercurrent operation as the all of the final solution had a pH greater than 3 and some iron could be removed from the solution.

| Column No. | Operating Method | Recycled % | kg $H_2SO_4$ per ton ore | Solution Tenor - g/l | | "Lead" Leach Extraction - % | | Overall Extraction % | |
|---|---|---|---|---|---|---|---|---|---|
| | | | | Ni | Fe | Ni | Fe | Ni | Fe |
| 1 | Single pass | 0 | 456 | 3.2 | 9.8 | — | — | 65.6 | 37.4 |
| 2 | Countercurrent | 79 | 454 | 3.1 | 11.0 | 7.4 | −4.3 | 66.1 | 27.7 |

In a similar fashion two Columns, No. 3 and No. 4, were fed a solution containing 100 g/l $H_2SO_4$ and 27 g/l NaCl to simulate heap leaching with seawater. Since 11% of Column No. 3 leachate had a pH greater than 3, only 89% of leachate collected from Column No. 3 needed to be recycled to Column No. 4. After the "lead" leaching was complete, Column No. 4 was fed with the simulated seawater. Results similar to the date above were obtained and are presented in the following table.

| Column No. | Operating Method | Recycled % | kg H$_2$SO$_4$ per ton ore | Solution Tenor - g/l | | "Lead" Leach Extraction - % | | Overall Extraction % | |
|---|---|---|---|---|---|---|---|---|---|
| | | | | Ni | Fe | Ni | Fe | Ni | Fe |
| 3 | Single pass | 0 | 622 | 2.9 | 10.3 | — | — | 86.0 | 59.3 |
| 4 | Countercurrent | 89 | 499 | 2.9 | 8.9 | 30.4 | 1.1 | 86.1 | 52.2 |

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed is:

1. A method of operating a heap leach process for leaching nickel from a laterite ore that comprises:

a. forming at least one heap from a mixture of the ore and concentrated sulfuric acid;

b. applying a leaching solution of between about 0.1% to about 20% by weight sulfuric acid to the top of the heap at a first average flux rate wherein a leach liquor is formed at a bottom of the heap; and, c. directing the leach liquor output from step (b) into a product liquor sump for direct delivery to a processing plant for substantially extracting nickel values.

2. The method of claim 1 wherein the nickel bearing ore contains at least about 10% by weight of a clay component.

3. The method of claim 2 wherein the ore has an average particle size less than about 1 inch.

4. The method of claim 1 wherein the mixture of ore and concentrated sulfuric acid is formed by a. sizing the nickel bearing ore such that it has an average particle size less than about 1 inch;

b. mixing the sized ore with concentrated sulfuric acid; and, c. agglomerating the sized ore to form agglomerated particles having an average particle size in the range from about 6 mesh to about 1 inch.

5. The method of claim 4 further comprising the step of curing the agglomerated particles.

6. The method of claim 1 wherein the sulfuric acid is applied to the top of the heap at a flux rate of at least 10 l/hr/m$^2$.

7. The method of claim 5 wherein the sulfuric acid is applied to the top of the heap at a flux rate of at least 20 l/hr/m$^2$.

8. The method of claim 1 wherein the leaching solution consists of seawater fortified with sulfuric acid.

9. The method of claim 1 wherein a plurality of heaps is formed to define a lead heap and a lag heap.

10. The method in claim 7 wherein one of the heaps is used as an iron precipitation reactor.

11. The method of claim 1 wherein the at least one heap includes bedrock material for final pH control and iron precipitation.

12. The method of claim 11 wherein the bedrock material is roasted at a temperature of between 300° and 800° C.

* * * * *